Figure 1:
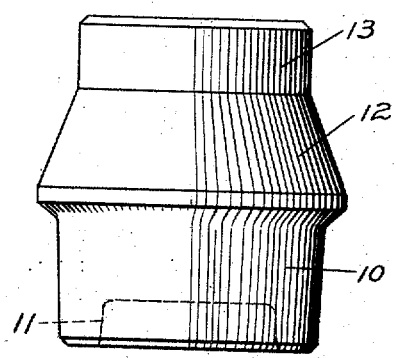

C. H. JOCKMUS.
FORGED BLANK FOR FUSE BODIES.
APPLICATION FILED FEB. 3, 1916.

1,189,958.  Patented July 4, 1916.

WITNESS
Chester F. Hayden

INVENTOR
Charles H. Jockmus
BY
A. M. Wooster
ATTORNEY

UNITED STATES PATENT OFFICE.

CHARLES H. JOCKMUS, OF ANSONIA, CONNECTICUT.

FORGED BLANK FOR FUSE-BODIES.

1,189,958.  Specification of Letters Patent.  Patented July 4, 1916.

Application filed February 3, 1916. Serial No. 76,016.

*To all whom it may concern:*

Be it known that I, CHARLES H. JOCKMUS, a citizen of the United States, residing at Ansonia, county of New Haven, State of Connecticut, have invented an Improvement in Forged Blanks for Fuse-Bodies, of which the following is a specification.

This invention relates to the manufacture of the bodies for time fuses for shells, and has for its object to produce a novel configuration of blanks for fuse bodies which may be forged to approximately the final form, will require a minimum amount of metal, there being no waste or lost pieces, other than the metal necessarily removed by the various machining operations, and which permits either end of the blank to be gripped easily and conveniently for machining purposes, so that there is no loss of time in handling, as either end of the blank may be gripped perfectly rigidly by a chuck, and held while the machining operations upon the opposite end of the blank are performed.

With these and other objects in view, I have devised the novel fuse body blank which I will now describe, referring to the accompanying drawing forming a part of this specification, and using reference characters to indicate the several parts:—

Figure 2:
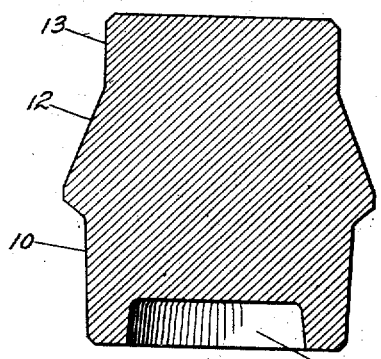
Figure 3:
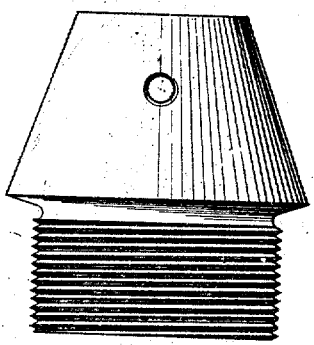
Figure 4:
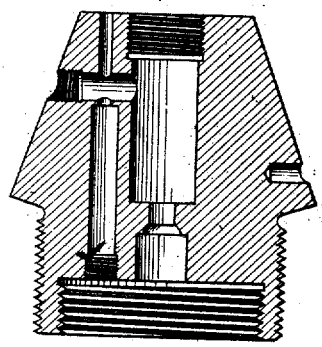

Figure 1 is an elevation of my novel fuse body blank as completed by the forging operation; Fig. 2 a longitudinal section corresponding therewith; Fig. 3 an elevation of a finished fuse body, that is, after the various machining operations have been completed, and Fig. 4 is a section of a completed fuse body.

It will be noted that the completed body comprises a threaded shank having a recess in its base, and a head in the form of a truncated cone, the lower end of the head being of greater diameter than the shank, and the upper end of the head of less diameter than the shank. It will be noted furthermore from Fig. 4 that a number of machining operations are required to complete the body, several of which must be performed on the shank end of the body while the head is gripped by a chuck. The difficulty experienced in holding the head ends of the body blanks while the machining operations were performed on the shank ends of the blanks, has been a serious obstacle to the economical manufacture of these fuse bodies, as it was of vital importance that the blanks should be produced without waste in the forging operation, and that the amount of metal cut away in the machining operations should be reduced to the minimum. After a long continued series of experiments, I succeeded in developing a forged body blank having the base recess forged therein and having a head two-thirds, more or less, of which should be forged to substantially its final form, merely sufficient amount of surplus metal to provide for perfect finishing being provided, and the tip of which should comprise a hub, shown as of approximately uniform diameter, adapted to be gripped by a chuck, so that the head end of the shank could be gripped firmly while the machining operations were being performed on the shank end.

My novel body blank as formed comprises a shank 10, having a recess 11 in its base, a head 12 of greater diameter at its lower end than the shank, and tapering upward and inward for two-thirds more or less of its length, and above the tapered portion a hub 13 adapted to be gripped by a chuck. In finishing the fuse body, the hub is first placed in a chuck, and the various machining operations upon the shank end of the body are performed while the body is held by means of the hub. After the shank end of the body has been machined, it is placed in a chuck and the necessary machining operations are performed upon the head end of the body, including the removal of a portion of the metal of the hub, sufficient to leave the configuration of the head that of a perfect truncated cone.

Having thus described my invention, I claim:

1. A blank for a fuse body forged with a shank at one end, and a head having a portion in the form of a truncated cone, the base of which is of greater diameter than that of the shank, said head also having a chuck-engaging portion, the base of which coincides with the top of said truncated cone portion.

2. A blank for a fuse body forged with a shank at one end, and a head having a portion in the form of a truncated cone, the base of which is of greater diameter than that of the shank, said head also having an approximately cylindrical chuck engaging portion, the base of which coincides with the top of said truncated cone portion.

3. The method of producing fuse bodies which comprises forging a blank with a shank at one end and a cone-shaped head provided with a chuck-engaging portion, providing the blank with the necessary bores, apertures, and threads, and finally shaping the chuck-engaging portion to conform to the taper of said head.

In testimony whereof I affix my signature.

CHARLES H. JOCKMUS.